3,669,826
LAMINATED STRUCTURES
Ronald E. Davey, Solihull, Charles N. Tomlinson, Suton Coldfield, and Alan White, Wythall, England, assignors to Treplex Safety Glass Company Limited, London, England
No Drawing. Filed May 19, 1969, Ser. No. 825,975
Claims priority, application Great Britain, May 24, 1968, 25,070/68
Int. Cl. B32b 15/08, 17/10
U.S. Cl. 161—196
7 Claims

ABSTRACT OF THE DISCLOSURE

In a process for increasing the adhesion at the interface between a synthetic plastics material and a thin transparent material deposited upon a vitreous material surface in a laminated structure, the transparent material is selected from an electro-conductive metal film and an electro-conductive film covered by a film of metal oxide, and, prior to lamination, is treated with a solution of a potassium salt electrolyte, washed and dried.

BACKGROUND OF THE INVENTION

(1) Field of the invention

The present invention is concerned with a process for increasing the adhesion between synthetic plastics materials and thin transparent electro-conductive films deposited upon vitreous surfaces and to improved structures thereby produced.

(2) Description of the prior art

Transparent laminated structures comprising a number of alternate layers of transparent synthetic plastics and glass are well known. For certain applications e.g. in windscreens of aircraft, it is also known to employ a thin transparent electro-conductive metallic film such as a film of gold as a heating element between the glass and plastics layers in order to displace ice and water from the outer surface of the structure. During the flight path of an aircraft the windscreen is continually subjected to a changing pattern of stresses due to temperature and pressure changes, and this can result in almost continuous flexing of the glass components, which imposes strains at all interfaces where dissimilar materials are bonded together. Eventual failure of the laminated component will occur at the interface which is weakest.

It has been found that the adhesion between a transparent synthetic plastics material and the thin transparent electro-conductive films deposited upon a glass surface is weak. If such an inter-surface bond is incorporated into a transparent laminated component, then the service life of the completed assembly is limited by the duration of time for which this bond remains intact.

It is an object of the present invention to substantially increase the adhesion at the interface between a synthetic plastics material and thin transparent electro-conductive films or film complexes deposited upon vitreous surfaces.

SUMMARY

Accordingly the present invention is a process for increasing the adhesion at the interface between a synthetic plastics material and a thin transparent electro-conductive film or film complex deposited upon a vitreous material surface in a laminated structure which comprises, prior to lamination, treating the thin transparent electro-conductive film or film complex deposited upon the vitreous material surface with a solution of a potassium salt electrolyte and thereafter washing and drying the surface.

The present invention also includes within its scope laminated structures comprising alternate layers of synthetic plastics material and vitreous material and wherein a surface of the vitreous material adjacent the plastics material has a thin transparent electro-conductive film or film complex deposited thereon in which the deposited film or film complex supported by the vitreous surface is pretreated in accordance with the above process.

Suitable potassium salt electrolytes are aqueous solutions of potassium permanganate, potassium chromate or potassium dichromate. The use of potassium permanganate is preferred. Concentrations of aqueous solutions may range from fully saturated to very dilute solutions e.g. 0.000,001 molar. With potassium permanganate the best results have been achieved with an 0.025 molar solution.

The synthetic plastics material may be any materials conventionally employed in the production of laminated structures with vitreous materials. Specific examples of such plastics materials are polyvinyl butyral resin or organo silicon elastomers. Such organo silicon elastomers are often used as the bonding material in composite assemblies, for example, in those which are intended to form the windscreens of high speed aircraft, where extremes of temperature are encountered.

Similarly the vitreous materials may be any type of glass commonly used in the production of such laminated structures, for example, a sheet of glass. In order to withstand the effect of heating during manufacture and subsequent use, it is preferable that the sheet of glass should be strengthened by thermal or chemical toughening.

Where application of the laminated structures is in windscreens etc., both plastics materials and vitreous materials will, of course, be transparent.

The thin transparent electro-conductive film may be a metal film such as a film of gold. This film may be covered by a further film of a substance such as bismuth oxide, the resultant composite film being referred to as a "film complex."

DESCRIPTION OF THE PREFERRED EMBODIMENT

The invention may be put into effect in the following manner. A sheet of glass which it is intended to treat is cleaned and a thin film of gold is deposited over the required area of one surface by sputtering or by thermal evaporation. This film may be about 0.000,000,2 inch thick, and it can be deposited upon a substratum of bismuth oxide of about 0.000,006 inch thick, which considerably improves the adhesion of the gold to the glass. A further thin film of bismuth oxide of about 0.000,005 inch thick can be added as a protective coating to the gold film.

The sheet of glass with the thin transparent electroconductive film complex deposited on one surface, is completely immersed in an aqueous solution of for example potassium permanganate and left immersed for 5 minutes. After completion of the time for immersion, the glass sheet is removed and thoroughly washed down with clean water to remove all traces of the solution of potassium permanganate. The glass sheet is then dried and is ready for lamination to a layer of polyvinyl butyral resin and further sheets of glass and layers of polyvinyl butyral resin to form a composite assembly, by the known process of subjecting the assembly to elevated temperatures and pressures.

In an experiment to compare the improvement in adhesion, two similar composite assemblies were made up, the only difference being that the glass component with the thin film complex on its surface was in one case treated with a solution of potassium permanganate as described above. The two composite assemblies were then mounted side by side in an environmental test rig, so that the two assemblies could be subjected to an identical cycle of continuously changing temperatures and pressures. After a considerable period of exposure of both assemblies to this treatment, the assemblies were removed and examined.

It was found that delamination had commenced from the edges of the bond between the polyvinyl butyral resin and the thin film complex, but in the case of the bond which had received the special pretreatment, this did not extend beyond the immediate marginal edge of the bond. However this delamination would have been insufficient to render the composite assembly unserviceable, if it had been incorporated as the windscreen of the aircraft. On the other hand the assembly which had not received the special pretreatment, exhibited a considerable breakdown in the bond, and the delamination extended over a considerable area. In this latter case the delamination would have been sufficient to render the composite assembly completely unserviceable, if it had been incorporated as the windscreen of an aircraft.

The invention is described in more detail with reference to the following examples:

EXAMPLES

Because of the extended time required for the completion of full life tests on composite assemblies (up to several thousand hours), a simple peel test was used to assess the improvement in adhesion between the polyvinyl butyral resin and the thin transparent electro-conductive film complex deposited upon a glass sheet. The peel tests were performed on a Houndsfield Tensometer using a 8" x 1½" x ¼" sheet of twin ground plate glass to the selected surface of which were laminated four layers of 0.020" thick polyvinyl butyral resin containing between pairs of polyvinyl butyral resin layers a strengthening strip of 0.018" thick aluminium. The dynamic load required on the polyvinyl butyral resin layers and the aluminium strip, when pulled at right angles to the surface of the glass sheet, to just detach the combination from the glass sheet was measured and called the peeling load.

A batch of 24 glass samples 8" x 1½" x ¼" were prepared and a thin transparent electro-conductive film complex was simultaneously deposited on one surface of each sample by sputtering in a vacuum chamber. Sufficient potassium salt electrolyte was dissolved in de-ionised water to give two litres of 0.025 molar solution, and the three electrolytes chosen are listed in the table below. Six glass samples were placed in each of three two litre beakers, and each beaker contained a different electrolyte. One set of six glass samples was left untreated. Each solution was stirred intermittently for the duration of the treatment, each glass sample being lifted in and out at least once to ensure complete wetting and uniform attack. The temperature of the solutions and the time for treatment were 17° C. and 20 minutes respectively in each case. After treatment each glass was removed from the solution, thoroughly washed in running tap water, and dried with a jet of filtered compressed air.

Each glass sample was laminated to a similar piece of unfilmed glass by four layers of 0.020" thick polyvinyl butyral resin incorporating a strip 0.018" thick aluminium. In order that the unfilmed glass could be removed prior to testing, its surface which would be in contact with the polyvinyl butyral resin layer was coated with a release agent. All the pieces of polyvinyl butyral resin used were cut from the same roll to eliminate any variability in this material. The moisture content of the polyvinyl butyral resin was determined before lamination by an infra-red absorption method, and this was controlled in the range 0.4 to 0.5% to minimise the effect of this variable. Finally all the 24 glass samples, including both the treated and the untreated, were autoclaved together.

All the samples were submitted to the peel test, and the peeling loads obtained are recorded in the table below. They may be compared with a peeling load of 150 lbs. obtained for unfilmed toughened twin ground plate glass.

TABLE

| Example No. | Electrolyte | Peeling load (lbs.) |
|---|---|---|
| 1 | Untreated | 30 |
| 2 | Potassium chromate | 50 |
| 3 | Potassium dichromate | 55 |
| 4 | Potassium permanganate | 100 |

The above examples clearly demonstrate that the adhesion at the interface between the polyvinyl butyral resin and the thin transparent electro-conducting film complex is increased by treatment in accordance with the invention.

We claim:

1. A laminated structure comprising alternate layers of transparent synthetic plastics material of the type capable of firmly adhering to a sheet of glass when contacted therewith under elevated temperature and pressure to provide a laminated structure and sheets of glass, and wherein a surface of at least one of the glass sheets adjacent the plastics material has a thin transparent material deposited thereon, the transparent material being selected from the group consisting of an electroconductive metallic gold film and an electro-conductive metallic gold film covered by a film of bismuth oxide, in which prior to lamination the transparent material supported by the sheet glass is subjected to treatment with an aqueous solution of a potassium salt selected from the group consisting of potassium chromate, potassium dichromate and potassium permanganate, washed and dried.

2. In the method of making a laminated windscreen which includes the steps of:
   (a) depositing a transparent thin film of electro-conductive material selected from the group consisting of gold and gold covered with bismuth oxide upon a first sheet of glass;
   (b) bonding a layer of transparent synthetic resinous material to the thin film of step (a), which layer of transparent synthetic material is of the type which is capable of firmly adhering to a sheet of glass when contacted therewith under elevated temperature and pressure for enabling a second sheet of glass to be laminated with said first sheet of glass; the improvement which comprises, prior to step (b), of
   (c) wetting the thin film deposited in step (a) with an aqueous solution of a potassium salt capable of materially increasing the potential adhesion of gold or bismuth oxide to said synthetic resinous material;
   (d) washing the article to remove the potassium salt and then drying same whereafter to perform step (b) and effect such increased adhesion of the synthetic resinous material to said thin film of electro-conductive material.

3. A process as claimed in claim 2, wherein the potassium salt is selected from the group consisting of potassium chromate, potassium dichromate and potassium permanganate.

4. A process as claimed in claim 2, wherein the aqueous solution of step (c) is a 0.025 molar aqueous solution of potassium permanganate.

5. In the method according to claim 2 wherein said electroconductive material is gold and said potassium salt is selected from the group consisting of potassium permanganate, potassium chromate and potassium dichromate, 6. In the method of making a laminated windscreen which includes the steps of:
   (a) depositing a transparent thin film of electro-conductive material upon a first sheet of glass;
   (b) coating the thin film of step (a) with a transparent thin film of bismuth oxide; and
   (c) bonding a layer of synthetic resinous material to the thin film of step (b), which layer is transparent and is capable of firmly adhering to a sheet of glass when contacted therewith under heat and pressure for enabling a second sheet of glass to be laminated with said first sheet of glass; the improvement which comprises, prior to step (c), of (d) wetting the thin film of step (b) with a potassium salt electrolyte capable of materially increasing the potential adhesion of said synthetic resinous material to said bismuth oxide; and then (e) washing the article to remove the potassium salt electrolyte and then drying the same whereafter to perform step (c) and effect such increased adhesion of the synthetic resinous material to said thin film of step (b).

7. The method according to claim 6 wherein said synthetic resinous material is polyvinyl butyral and said potassium salt electrolyte is selected from the group consisting of potassium permanganate, potassium chromate and potassium dichromate.

References Cited

UNITED STATES PATENTS

| | | | |
|---|---|---|---|
| 2,676,117 | 4/1954 | Colbert et al. | 161—225 X |
| 2,760,890 | 8/1956 | Kosmos | 161—225 X |
| 2,837,454 | 6/1958 | Watkins et al. | 156—99 X |
| 2,884,161 | 4/1959 | Hurd et al. | 161—225 X |
| 3,352,742 | 11/1967 | Zunich et al. | 161—216 X |
| 3,468,749 | 9/1969 | Mattimoe et al. | 161—165 X |

FOREIGN PATENTS

| | | | |
|---|---|---|---|
| 122,215 | 11/1959 | U.S.S.R. | 161—225 |

JOHN T. GOOLKASIAN, Primary Examiner

C. B. COSBY, Assistant Examiner

U.S. Cl. X.R.

156—99, 308, 334; 161—193, 204, 207, 218, 225; 296—84

UNITED STATES PATENT OFFICE
CERTIFICATE OF CORRECTION

Patent No. 3,669,826  Dated June 13, 1972

Inventor(s) Ronald E. Davey, Charles N. Tomlinson and Alan White

It is certified that error appears in the above-identified patent and that said Letters Patent are hereby corrected as shown below:

In the assignee's name "Treplex" should be -- Triplex --

Signed and sealed this 3rd day of October 1972.

(SEAL)
Attest:

EDWARD M. FLETCHER, JR.
Attesting Officer

ROBERT GOTTSCHALK
Commissioner of Patents